US008527321B2

(12) United States Patent
Bottom

(10) Patent No.: US 8,527,321 B2
(45) Date of Patent: Sep. 3, 2013

(54) PRODUCT ASSORTMENT PLANNING SYSTEM

(75) Inventor: Joseph S. Bottom, Chico, CA (US)

(73) Assignee: Accenture Global Services Limited, Dublin (IE)

( * ) Notice: Subject to any disclaimer, the term of this patent is extended or adjusted under 35 U.S.C. 154(b) by 619 days.

(21) Appl. No.: 12/731,756

(22) Filed: Mar. 25, 2010

(65) Prior Publication Data

US 2011/0238459 A1    Sep. 29, 2011

(51) Int. Cl.
*G06Q 10/00* (2012.01)
(52) U.S. Cl.
USPC ....... 705/7.29; 705/7.12; 705/7.31; 705/7.35; 705/317; 705/348
(58) Field of Classification Search
None
See application file for complete search history.

(56) References Cited

U.S. PATENT DOCUMENTS

| | | | | |
|---|---|---|---|---|
| 6,366,890 | B1* | 4/2002 | Usrey | 705/7.31 |
| 7,277,926 | B1* | 10/2007 | Lee | 709/218 |
| 7,949,568 | B2* | 5/2011 | Fano et al. | 705/22 |
| 8,009,864 | B2* | 8/2011 | Linaker et al. | 382/103 |
| 8,108,270 | B2* | 1/2012 | Fotteler et al. | 705/28 |
| 8,370,184 | B2* | 2/2013 | Fotteler et al. | 705/7.12 |
| 8,370,185 | B2* | 2/2013 | Fotteler et al. | 705/7.12 |
| 2002/0099678 | A1* | 7/2002 | Albright et al. | 706/45 |
| 2005/0114196 | A1* | 5/2005 | Schoenmeyr | 705/10 |
| 2006/0149634 | A1* | 7/2006 | Pelegrin et al. | 705/22 |

OTHER PUBLICATIONS

R. Cooley, B. Mobasher, J. Srivastava, "Data Preparation for Mining World Wide Web Browsing Patterns," Journal of Knowledge and Information Systems, 1(1), 1999, 26 pages.*
E-Commerce Recommendation Applications, J. Ben Schafer, Joseph A. Konstan, John Riedl. Data Mining and Knowledge Discovery. Boston: Jan. 2001. vol. 5, Iss. 1-2; p. 115.*
Guy CM (1998). Classifications of retail stores and shopping centres: some methodological isses. GeoJournal. 45: 255-264.*
Kelkar, Oliver, Joerg Leukel, and Volker Schmitz. "Price modeling in standards for electronic product catalogs based on XML." Proceedings of the 11th international conference on World Wide Web. ACM, 2002.*
Saroja Subrahmanyan, Robert Shoemaker, Developing optimal pricing and inventory policies for retailers who face uncertain demand, Journal of Retailing, vol. 72, Issue 1, Spring 1996, pp. 7-30, ISSN 0022-4359.*

* cited by examiner

*Primary Examiner* — Gurkanwaljit Singh
(74) *Attorney, Agent, or Firm* — Mannava & Kang, P.C.

(57) ABSTRACT

The system includes a comparison unit that identifies products in an initial assortment of products, a desired assortment of products and the performance metric for each product. The comparison unit compares the initial assortment of products and the desired assortment of products to determine kept products, added product and deleted products. The system includes an interaction unit simulating the interaction of the kept products, the added products and the deleted products based on the performance metric. The system generates simulation results identifying the interactions between the kept products, the added products and the deleted products.

18 Claims, 6 Drawing Sheets

FIG. 3a

| Product | Sales volume Start (Scenario A) | Sales volume end Scenario B | STEP 301 | STEP 302 | STEP 303 | STEP 304 | STEP 305 |
|---|---|---|---|---|---|---|---|
| A1 Add |  | 3.856836319 | 4.620578766 |  |  |  | 3.598166704 |
| A2 Add |  | 29.07613182 |  | 27.82493591 |  |  | 27.12606239 |
| A3 Add |  | 4.961464405 |  |  | 4.185130596 |  | 3.179563311 |
| A4 Add |  | 3.693144798 |  |  |  | 3.445850134 | 2.366773605 |
| D1 Delete | 6.061239243 |  | 5.882586956 | 5.015981674 | 5.035277367 | 5.266183376 | 3.353943111 |
| D2 Delete | 5.380445004 |  | 5.221868501 | 4.452589989 | 4.469717979 | 4.674688339 | 2.97723031 |
| D3 Delete | 3.656149387 |  | 3.510532379 | 2.804176569 | 3.656149387 | 3.656149387 | 2.733744621 |
| K1 Keep | 1.599116325 | 1.531538248 | 1.599116325 | 1.599116325 | 1.242323041 | 1.318662313 | 1.078064084 |
| K2 Keep | 5.505663872 | 3.051332235 | 3.655566216 | 4.61849308 | 5.505663872 | 5.505663872 | 2.846686125 |
| K3 Keep | 5.216357231 | 2.176418543 | 5.108201981 | 2.082763195 | 5.216357231 | 5.216357231 | 2.030451059 |
| K4 Keep | 3.421191216 | 3.817978144 | 3.284932375 | 2.623969555 | 3.421191216 | 3.421191216 | 2.558063745 |
|  | 30.84016228 | 52.16484451 | 2.043211222 | 20.18186402 | 1.891648412 | 1.664603591 | 53.84876907 |

| Product | STEP 306 | STEP 307 | STEP 308 | STEP 309 | STEP 310 | STEP 311 | STEP 312 |
|---|---|---|---|---|---|---|---|
| A1 Add |  |  | -1.0224120062 | 1.02079916 | 0.047993554 | 1.068792714 | 2.52937399 |
| A2 Add |  | 340 | -0.69887352 | 19.4829905 | 0.916005804 | 20.39899631 | 6.727066086 |
| A3 Add |  |  | -1.005547285 | 0.8861011127 | 0.041660636 | 0.927761763 | 2.251821548 |
| A4 Add |  |  | -1.079076529 | 0.585527062 | 0.027528946 | 0.613056008 | 1.753717597 |
| D1 Delete | 333 | -2.707296133 |  |  |  |  |  |
| D2 Delete |  | -2.403214693 |  |  |  |  |  |
| D3 Delete |  | -0.922404766 |  |  |  |  |  |
| K1 Keep | -0.521052241 | 330 |  |  |  |  |  |
| K2 Keep | -2.658977747 |  |  |  |  |  |  |
| K3 Keep | -3.185906172 |  |  |  |  |  |  |
| K4 Keep | -0.86312747 |  |  |  |  |  |  |

SCENARIO B

| Product | STEP 313 | STEP 314 | STEP 315 | STEP 316 | STEP 317 | STEP 318 | STEP 319 | STEP 320 |
|---|---|---|---|---|---|---|---|---|
| A1 Add | 3.856836319 | 0.258669615 | 3.751420736 | 3.762692451 | 3.77005434 | | | |
| A2 Add | 29.07613182 | 1.950069427 | 28.28142166 | 28.36639786 | 28.42189789 | | | |
| A3 Add | 4.961464405 | 1.781881094 | 3.863170147 | 3.969193697 | 4.961464405 | | | |
| A4 Add | 3.693144798 | 1.326371193 | 2.875612497 | 2.954532862 | 3.693144798 | | | |
| D1 Delete | 0 | | 4.217867851 | | | 43.5% | -0.732512916 | -2.621430194 |
| D2 Delete | 0 | | | 3.852722645 | | 41.3% | -0.694985629 | -2.282244681 |
| D3 Delete | 0 | | | | 2.864337921 | 15.2% | -0.25642601 | -2.477318611 |
| K1 Keep | 1.531538248 | 0.453474164 | 1.531538248 | 1.531538248 | 1.078064084 | | | |
| K2 Keep | 3.051332235 | 0.204646111 | 2.96793294 | 2.976850271 | 2.982674599 | | | |
| K3 Keep | 2.176418543 | 0.145967484 | 2.116932392 | 2.123292923 | 2.127447128 | | | |
| K4 Keep | 3.817978144 | 1.259914398 | 3.743034363 | 3.751048088 | 2.680264711 | | | |
| | 52.16484451 | | 53.34693084 | 53.28826904 | 52.57934988 | | | |

PRODUCT ASSORTMENT PLANNING SYSTEM

BACKGROUND

Retailers generally attempt to maximize profits or other performance metrics such as sales volume through different types of retail strategies. In order to gain more customers and keep current customers, retailers are investing more and more into strategies to provide an assortment of products that meets customers' unique behaviors, needs and expectations. For example, retail assortment planning is a strategy used to specify a set or an assortment of products carried by a brick and mortar retailer or by an online retailer that meets the customers' preferences in products. The retail assortment planning may encompass selecting an assortment of products to offer for sale that would maximize the performance metric.

However, despite engaging in retail assortment planning, retailers regularly lose volume and profits on unpopular products existing in the assortment of products. This is because of the difficulty in determining how the addition or deletion of a product or a multitude of products affects the overall performance metric, such as profits or sales volume, of an assortment of products. Moreover, it is difficult to determine how the addition or deletion of a product affects the performance metric of each individual product in the assortment of products.

BRIEF DESCRIPTION OF DRAWINGS

The embodiments of the invention will be described in detail in the following description with reference to the following figures.

FIG. 3a illustrates an example of calculated performance metrics, according to an embodiment;

FIG. 3b illustrates an additional example of calculated performance metrics, according to an embodiment;

FIG. 3c illustrates another example of calculated performance metrics, according to an embodiment.

DETAILED DESCRIPTION OF EMBODIMENTS

Figure 1:
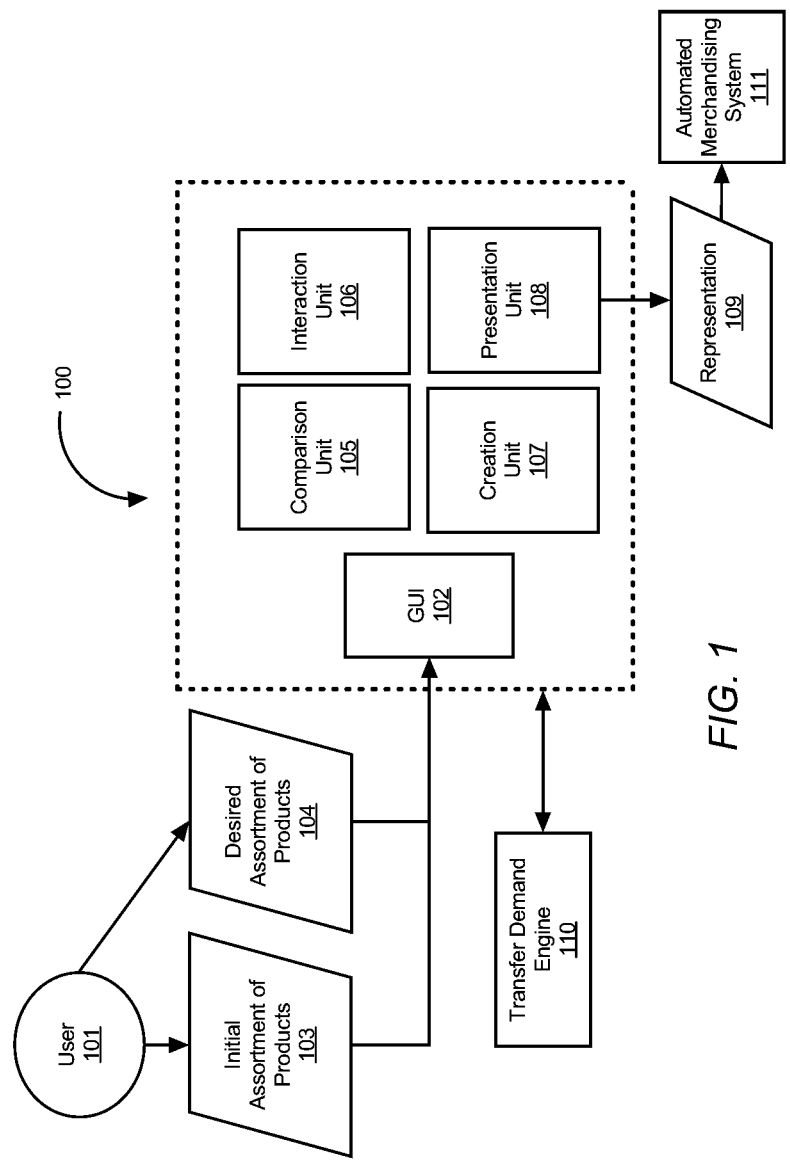
FIG. 1 illustrates a system for assortment planning simulation.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Overview

An assortment planning system, according to an embodiment, allows a retailer to optimize a performance metric, such as sales volume or profits, by simulating interactions between products or items in an assortment of products. For example, a retailer or other entity may utilize the assortment planning system to determine how an addition or deletion of a product or a multitude of products from an assortment of products affects a performance metric associated with the overall assortment. The retailer or other entity may also utilize the assortment planning system to determine how the addition or deletion of the product or the multitude of products affects the performance metric associated with each individual product in the assortment of products.

The simulation of the effect of the change in the assortment of products on sales volume, profits or another performance metric depends upon the interaction between products when a product is added to or deleted from the assortment of products. For example, if the performance metric is sales volume, when a product is added to an assortment of products, the product may cannibalize, or steal, sales volume from other individual products existing in the assortment of products. The added product may generate its own sales volume, i.e. an incremental change, without cannibalizing sales volume from other products in the assortment. When a product is deleted from an existing assortment of products, sales volume may be lost. Furthermore, other individual products existing in the assortment of products may recapture some or even all of the sales volume lost by deleting a product from the assortment of products.

Of course, other performance metrics instead of sales volume and/or profits may be utilized for determining the effect of additions to and deletions from an assortment of products, including gross margin, adjusted gross margin, contribution margin, consumer loyalty, or a combination of such metrics.

The systems and methods described herein simulate the effect of adding or deleting a product or a multitude of products from an existing assortment of products, thus providing the retailer with essential information to determine an assortment of products. According to an embodiment, the overall effect on sales volume and/or profits of an assortment of products as well as the effect on the sales volume and/or profits of each other individual product in the assortment of products is determined when products are added to or deleted from the assortment of products.

2. System

FIG. 1 illustrates assortment planning system 100, according to an embodiment. The assortment planning system 100 includes graphical user interface (GUI) 102, initial assortment of products 103, desired assortment of products 104, comparison unit 105, interaction unit 106, creation unit 107, presentation unit 108 and transfer demand engine 110. A user 101 may interact with the assortment planning system 100 as further described below.

The user 101 accesses the GUI 102 to enter the initial assortment of products 103 and the desired assortment of products 104 into the assortment planning system 100. The user 101 may enter the initial assortment of products 103 and the desired assortment of products 104 by entering a unique product identifier into the assortment planning system 100, such as a stock keeping unit (SKU). The initial assortment of products 103 and the desired assortment of products 104 may contain multiple products. The user also enters a performance metric associated with each product in the initial assortment of products 103 and the desired assortment of products 104. The performance metric may be sales volume associated with the product in the initial assortment of products 103 and the desired assortment of products 104 that was entered into the assortment planning system 100. The sales volume may be the number of units sold per time or location or the amount sold per time or location. Other performance metrics may be utilized including gross margin, adjusted gross margin, contribution margin, consumer loyalty, or a combination of such metrics. The sales volume or other performance metric values for the products in the initial assortment of products 103 and the desired assortment of products 104 may be obtained from either historical performance data or a forecast method, possibly for a larger set of products. According to an embodiment, instead of a user entering the initial assortment of products 103, the desired assortment of products 104 and the associated performance metric for each product, this information can be automatically retrieved by the assortment planning system 100 from a database or other data storage unit. According to another embodiment, the user imports into the assortment planning system 100 a collection of products representing the initial assortment and the performance metric associated with each product as well as a collection of products representing the desired assortment of products and the performance metric associated with each product, from a related system such as an assortment modeling or space modeling system.

The comparison unit 105 of the assortment planning system 100 compares the initial assortment of products 103 and the desired assortment of products 104 and determines which products are kept products, if any, and which products are added products and/or deleted products. Kept products are products present in both the initial assortment of products 103 and the desired assortment of products 104. There may be no kept products in the desired assortment of products 104. Added products are products existing in the desired assortment of products 104, and not existing in the initial assortment of products 103. There may be no added products in the desired assortment of products 104. Deleted products are products existing in the initial assortment of products 103, and not existing in the desired assortment of products 104. There may be no deleted products deleted from the initial assortment of products 103. The result of the determination of kept, added and deleted products may be stored in a storage system of the assortment planning system 100, such as memory or a database.

The interaction unit 106 performs several calculations based on the value of the performance metric associated with each of the kept, added and deleted products in order to simulate the interaction of the products. The calculations performed by the interaction unit 106 are described below with reference to FIGS. 2 and 3a-3c. The values of FIGS. 3a-3c correspond to the representation 109 shown in FIG. 2.

The transfer demand engine 110 determines the relationship between products for assortment planning. For example, if a new product is added to a group of products, the transfer demand engine 110 recalculates the performance metric, such as sales volume, for each of the products in the group. Transfer demand engines are known in the art and typically utilize historic data and models to estimate the performance metrics.

Figure 2:
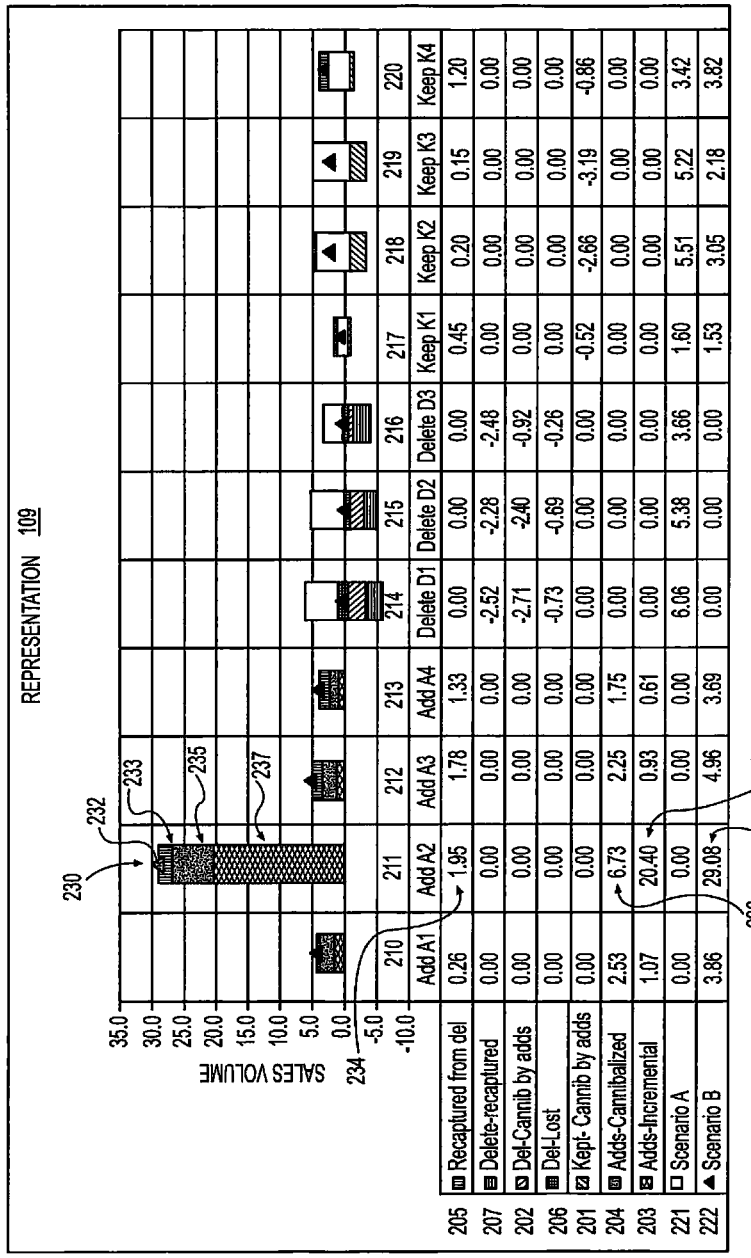
FIG. 2 illustrates a representation of the interaction between kept, added and deleted products, according to an embodiment.

The creation unit 107 creates a representation 109, which is a representation of the interaction between the kept, added and deleted products. FIG. 2 illustrates an example of the representation 109 of the interaction between kept, added and deleted products, which are determined from a simulation of comparing of scenario A listed as 221 in FIG. 2, corresponding to the initial assortment of products 103, and scenario B listed as 222 in FIG. 2, corresponding to the desired assortment of products 104. Thus, FIG. 2 allows a retailer to optimize the performance metric by utilizing the representation 109 to determine how an addition or deletion of a product or a multitude of products from an assortment of products affects the overall performance metric of the assortment and how the addition or deletion of the product or the multitude of products affects the performance metric of each other individual product in the assortment of products.

In FIG. 2, eleven items or products are shown listed as 210-220. Of products 210-220, four are added products 210-213 (which are added to scenario A to create scenario B), three are deleted products 214-216 (which are deleted from scenario A to create scenario B), and four are kept 217-220 (which are kept from scenario A in scenario B). In FIG. 2, these eleven products 210-220 are listed as added products A1-A4, deleted products D1-D3 and kept products K1-K4. Of course, additional products or fewer products may be shown in the representation 109. In FIG. 3a, these eleven products are listed as "Add" for added products A1-A4, "Delete" for deleted products D1-D3 and "Keep" for kept products K1-K4.

Referring to FIG. 2, for each of the products shown in the representation 109, seven variations of the performance metric are shown graphically and numerically. The seven variations represent the interactions among the products, including "Kept-Cannib by adds" 201, "Del-Cannib by adds" 202, "Adds-Incremental" 203, "Adds-Cannibalized" 204, "Recaptured from del" 205, "Del-Lost" 206 and "Delete-Recaptured" 207. Determining the values for each of the items 201-207 is described with respect to FIGS. 3a-c below. Numerically, the value for the seven variations are shown in a table in FIG. 2 for products A1-A4, D1-D3 and K1-K4. The seven variations are also shown in a bar chart in FIG. 2. For example, for product A2, a bar 230 is shown. The bar 230 represents the overall sales volume. For A2, the value of the bar reaches 29.08, also shown in the table at 231. The triangle 232 indicates that product A2 is from Scenario B. The overall value of the bar 230 is comprised of "Recaptured from del" with a value of 1.95, shown in the bar as 233 and shown in the table as 234; "Adds-Cannibalized" with a value of 6.73, shown in the bar as 235 and shown in the table as 236 and "Adds-Incremental" with a value of 20.40, shown in the bar as 237 and shown in the table as 238. Thus, the bar chart of FIG. 2 represents the values and interactions of the table in FIG. 2. Also, the steps described in FIGS. 3a-c are described with respect to the assortment planning system 100 shown in FIG. 1 by way of example and not limitation.

Item 201, "Kept-Cannib by adds", represents, for each of the kept products K1-K3, sale volume that has been cannibalized, or stolen, by each of the newly added products. The interaction unit 106 shown in FIG. 1 may determine this value. Calculating the item 201 for the kept products is now described with respect to steps 301-306 shown in FIGS. 3a-b.

Step 306 shown in FIG. 3b shows the sales volume cannibalized from the kept products K1-K3, i.e. the item 201 "Kept-Cannib by adds", for each of the kept products K1-K3. In order to determine the values in step 306, preliminary determinations are made in steps 301-305 shown in FIG. 3a.

FIG. 3a shows the products in scenarios A and B and their corresponding sales volumes in the first two columns, and also shows which products are added, deleted and kept in the third column. FIG. 3a also shows the total sales volume for scenario A, shown as 357, and the total sales volume for scenario B, shown as 355. With regard to the preliminary determinations made in steps 301-305, first, the sales volume of each product is recalculated in steps 301-304 by the transfer demand engine 110 when each product identified as an added product A1-A4 is added to scenario A 221, one at a time. In each of steps 301-304, the interaction unit 106 creates an intermediate desired assortment of products. For example, products A1-A4 are each added to scenario A 221, one at a time, creating four different intermediate desired assortments of products, shown in steps 301-304 of FIG. 3a. The sales volume is recalculated for all products in each of the intermediate desired assortment of products by the transfer demand engine 110 (shown in FIG. 1), which includes the products of scenario A 221 and the added product for that particular step of steps 301-304. Note that the sales volume of one or more of the products D1-D3 and K1-K3 changes in each of the intermediate desired assortments of products as a result of adding one of the products A1-A4. In particular, the sales volume in the intermediate desired assortment of products may contain at least one product whose sales volume has been cannibalized by a newly added product A1-A4.

The sales volume is also recalculated by the transfer demand engine 110 for each product as a result of the simultaneous addition of all added products, when the products identified as added products are added simultaneously to scenario A 221, as shown in step 305 of FIG. 3a. Thus, step 305 of FIG. 3a, shows the resulting estimated sales volume of the products when all four added products have been added to the initial assortment of products 103. Moreover, item 356 shows the total sales volume when all products A1-A4 are added to scenario A, i.e. before the deleted products are deleted.

For each of the kept products, the sales volume cannibalized by each of the newly added products from the kept product is finally calculated in step 306 of FIG. 3b by the interaction unit 106 in which the values of the products in scenario A 221 are subtracted from corresponding values of the products in step 305, thus resulting in "Kept-Cannib by adds" 201 of FIG. 2. For example, for kept product K1 in FIG. 3b, the sales volume cannibalized from kept product K1 by the added products is −0.521052241, listed as 330 in FIG. 3b. This value is obtained by subtracting 1.599116325, the initial sales volume value for product K1 from scenario A 221 listed as 332 in FIG. 3a, from 1.078064084, the recalculated sales volume value for product K1 listed as 331 in FIG. 3a, after all four of the added products have been simultaneously added.

Item 202, "Del-Cannib by adds", represents, for each of the deleted products, the sales volume that has been cannibalized, or stolen, by each of the newly added products from each of the deleted products. For each deleted product, the interaction unit 102 calculates the sales volume cannibalized by newly added products in step 307, in which the values of the products in scenario A 221 are subtracted from corresponding values of the products in step 305, thus resulting in "Del-Cannib by adds" 202 of FIG. 2. For example, for deleted product D1 in FIG. 3b, the sales volume cannibalized from deleted product D1 by the added products is −2.707296133, listed as 333 in FIG. 3b. This value is obtained by subtracting 6.061239243, the initial sales volume value for product D1 from scenario A 221 listed as 334 in FIG. 3a, from 3.35394311, the recalculated sales volume value for product D1 listed as 335 in FIG. 3a, after all four of the added products have been simultaneously added.

Item 203, "Adds-Incrmental", represents, for each of the added products, an incremental sales volume gained upon adding the product to the initial assortment of products 103, that has not been cannibalized from other products. The interaction unit 106 determines this value in steps 308-311 of FIG. 3b. More specifically, in step 308, the sales volume recaptured by the other added products are calculated for each of the added products by subtracting the sales volume value of the added product in step 305, when all four of the products were added simultaneously, from the sales volume value of the added product when it had been added to the initial assortment of the products 103 individually (i.e. the value from one of steps 301-304). For example, for product A1, the sales volume recaptured by other products is −1.022412062, listed as 336 in FIG. 3b. This value is obtained by subtracting 3.598166704 listed as 337 in FIG. 3a from 4.620578766 listed as 338 in FIG. 3a.

Then, in step 309, the estimated incremental sales volume upon adding the product is calculated for each of the added products by adding the value of the added product in step 308 to the single product incremental value upon adding the product individually (calculated during steps 301-304). For example, for product A2, the estimated incremental sales volume is 19.4829905 listed as 339 in FIG. 3b. This value is calculated by adding the value of product A2 in step 308, −0.69887352, listed as 340 in FIG. 3b, to the single product incremental value of product A2, 20.18186402, listed as 341 in FIG. 3a.

Next, in step 310, the total incremental sales volume upon adding the product for each of the added products should equal to the change from the value of the product in scenario A to the value of the product in step 305, where all four of the added products are included. For example, the total sales volume of the products in scenario A is 30.84016228, shown as 357 in FIG. 3a. The total sales volume from step 305 is 53.84876907, shown as 356 in FIG. 3a. The incremental change from scenario A to step 305 is therefore the difference between 357 and 356, resulting in a value of 23.00860679. Depending on how the added products interact with each other and with the kept products and the to-be deleted products, the total of the estimated incremental sales volume upon adding the added product in the prior step 309 which is 21.975417849, will approximate but not always equal the net increment change from the adds previously calculated as 23.00860679. Thus, the error in the estimate is therefore 1.033188937. In step 310, an adjustment is therefore calculated for each added product, which allocates the difference of 1.033188937 based on each product's share of the total estimate 309. For example, for added product A3, the adjustment in the estimate would be 0.886101127, listed as 343 in FIG. 3b, times the error in the estimate 1.033188937 divided by the total sales volume from step 309 of 21.975417849 resulting in the value 0.041660636, listed as 344 in FIG. 3b.

In step 311, for each of the added products, the incremental sales volume gained upon adding the product to the initial assortment of products 103, not including cannibalized sales volume is finally determined by the interaction unit 106. This value is determined by summing, for each of the added products, the value for the product in steps 309 and 310, thus resulting in "Adds-Incrmental" 203 of FIG. 2. For example, for product A3, the incremental sales volume gained upon adding the product is 0.92776173, listed as 342 in FIG. 3b. This value is obtained by adding the value of product A3 in step 309, 0.886101127, listed as 343 in FIG. 3b, and the value of product A3 in step 310, 0.041660636, listed as 344 in FIG. 3b, thus resulting in "Adds-Incrmental" 203 of FIG. 2.

Item 204, "Adds-Canibalized", represents, for each of the added products, the sales volume cannibalized from the deleted products and the kept products. The interaction unit 106 determines this value for each of the added products in step 312 by subtracting the value for the added product in step 311 from the value of the added product in step 305, thus resulting in "Adds-Canibalized" 204 of FIG. 2. For example, product A4, the sales volume cannibalized from the deleted products and the kept products is 1.753717597, listed as 345 in FIG. 3b. This value is obtained by subtracting the value of product A4 in step 311, 0.613056008, listed as 346 in FIG. 3b, from the value of the product A4 in step 305, 2.366773605, listed as 347 in FIG. 3a.

Item 205, "Recaptured from del", represents, for each of the added products and the kept products, determining sales volume recaptured from the deleted products. The interaction unit 106 determines this value for each of the products in step 314 by subtracting the value for the product in step 305 from the value of the product from scenario B 222 as shown in step 313, thus resulting in "Recaptured from del" 205 of FIG. 2. For example, for kept product K4, the sales volume recaptured from the deleted products is 1.259914398, listed as 348 in FIG. 3c. This value is obtained by subtracting the value of product K4 in step 305, 2.558063745, listed as 349 in FIG. 3a, from the value of the product K4 in step 313, 3.817978144, listed as 350 in FIG. 3c.

Item 206, "Del-Lost", represents the sales volume lost for each of the deleted products that has not been cannibalized or recaptured by other products. This value is shown in step 319 but determined in steps 315-319.

In steps 315-317, each of the deleted products are added back to scenario B one at a time, the desired assortment of products 104 shown in step 313. As each deleted product is added back to scenario B, the sales volumes of each of the products in scenario B and the deleted products are recalculated by the transfer demand engine 110 and shown in steps 315-317. The recalculated sales volumes shown in steps 315-317 are the incremental change caused by the deletion of the deleted product. The total sales volume of each step 315-317 is calculated. For example, in step 315, product D1 is added to scenario B shown in step 313, and the sales volume for each of the products in scenario B and for the product D1 is recalculated and shown in step 315. The total sales volume of all the products in step 315, 53.34893084 listed as 354 in step 315, is also shown.

In step 318, for each of the deleted products, each product's share of the total incremental lost sales volume is calculated. For steps 315, 316, and 317, the total sales volume of all of the products from each step is subtracted from the total sales volume of scenario B, which results in an estimated incremental loss for each step. Then, the estimated incremental loss for steps 315-317 are summed. For example, the total sales volume from step 315 is 53.34899084, shown as 354 in step 315, it is subtracted the total sales volume of Scenario B, 52.164884451 shown as 354. The subtraction yields the estimated incremental loss of −1.184086322 from the deletion of D1. After performing similar calculations for D2 and D3, add the results to obtain −2.72201623. Then each estimated incremental loss is divided by the added result. For example, product D1's estimated incremental loss, −1.184086322, is divided by −2.72201623. This percentage, 43.5% is product D1's share of the total incremental lost sales volume, shown as 359 in step 318.

In step 319, the lost sales volume for each deleted product is finally calculated by multiplying the value of the product in step 318 by the total lost sales volume from all deletions calculated for each product. The total lost sales volume from all deletions is −1.68392456, calculated as the difference between total sales volume in scenario B, 52.16484451 listed as 355 in FIGS. 3a and 3c and the total sales volume in step 305, 53.84876907 listed as 356 in FIG. 3a. Thus, the total lost sales volume is the −1.68392456 times 43.5%, listed as 359 in step 318 for product D1, resulting in a value of −0.732512916, shown as 358 in step 319 in FIG. 3c, and thus resulting in "Del-Lost" 206 of FIG. 2.

Item 207, "Delete-Recaptured", represents the recaptured sales volume for each deleted product. The interaction unit 106 determines this value in step 320 which is the sum of the value of the product in step 305 and the value of the product in step 319. For example, for deleted product D3, the recaptured sales volume is 2.477318611 listed as 351 in FIG. 3c. This is determined by adding the value of the product D3 in step 319, 0.25642601, listed as 352 in FIG. 3c, to the value of the product D3 in step 305, 2.733744621, listed as 353 in FIG. 3a.

Based on the calculated items in 301-320 above, the creation unit 107 creates the representation of the interaction between the kept, added and deleted products 109. The creation unit creates the representation 109 including items 201-207 in the representation 109 passes the representation 109 to the presentation unit 108. The presentation unit 108 presents the representation 109. The representation 109 can be output to the GUI 10, output to a printer, output to another system, etc. The representation 109 may also be output to an automated merchandising system 111 in which an online catalog may be rearranged or products in an online catalog be reconfigured based upon the results in the representation 109. For example, once the representation 109 is passed to the automated merchandising system 111, the automated merchandising system 111 may rearrange an online assortment of products to reflect the desired assortment of products 114 if it is determined that the desired assortment of products 114 provides a positive effect on the overall sales volume. Moreover, a user such as an online retailer or a brick and mortar retailer may run several iterations of different assortments of products and create several representations 109 in order to determine the representation 109 that illustrates the optimal positive effect on overall sales volume in order to determine an optimal assortment of products.

3. Method

Figure 4:
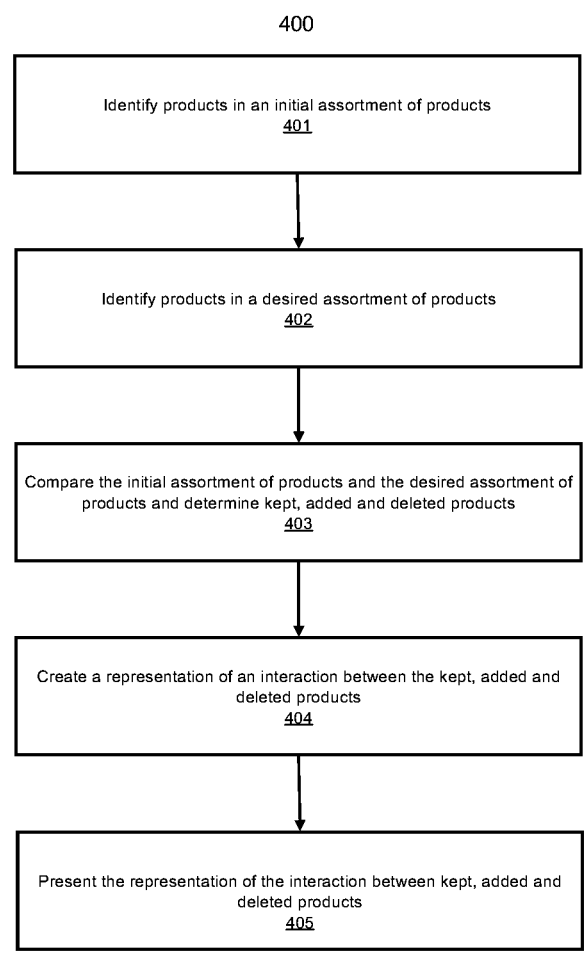
FIG. 4 illustrates a method for assortment planning simulation, according to an embodiment.

FIG. 4 illustrates method 400 for presenting a representation, such as the representation 109 shown in FIG. 2, of the interaction between added products, deleted products and kept products. The method 400 is described with respect to the planning system 100 by way of example and not limitation, and the method may be performed by other systems. Also, the method 400 summarizes the steps 301-320 described above with respect to FIGS. 3a-c.

At step 401, the assortment planning system 100 identifies products in an initial assortment of products and a value of a performance metric associated with each product in the initial assortment of products. According to an embodiment, a performance metric is the sales volume associated with the product in the assortment of products. Other performance metrics may include gross margin, adjusted gross margin and contribution margin, or a combination of such metrics. According to an embodiment, a user enters the initial assortment of products into the assortment planning system 100 by entering a unique product identifier into the assortment planning system 100, such as a stock keeping unit (SKU). According to another embodiment, instead of a user entering the initial assortment of products, the desired assortment of products and the associated performance metric for each product, this information can be automatically retrieved by the assortment planning system 100 from a database or other data storage unit. According to another embodiment, the user imports into the assortment planning system 100 a collection of products representing the initial assortment and a performance metric associated with each product and a collection of products representing the desired assortment of products and a performance metric associated with each product, from a related system such as an assortment modeling or space modeling system.

At step 402, the assortment planning system 100 identifies products in a desired assortment of products and a value of the performance metric associated with each product in the desired assortment of products. According to an embodiment, a user enters the desired assortment of products into the assortment planning system 100 by entering a unique product identifier into the assortment planning system 100, such as a stock keeping unit (SKU). According to another embodiment, instead of a user entering the initial assortment of products, the desired assortment of products and the associated performance metric for each product, this information can be automatically retrieved by the assortment planning system 100 from a database or other data storage unit. According to another embodiment, the user imports into the assortment planning system 100 a collection of items representing the desired assortment and each item's corresponding performance metric, from a related system such as an assortment modeling or space modeling system.

At step 403, the assortment planning system 100 compares the initial assortment of products and the desired assortment of products and determines which are considered kept products, added products and deleted products. Kept products are products present in both the initial assortment of products and the desired assortment of products. Added products are products existing in the desired assortment of products, and not existing in the initial assortment of products. Deleted products are products existing in the initial assortment of products, and not existing in the desired assortment of products.

At step 404, assortment planning system 100 runs a simulation and performs several calculations based on the values of the performance metric for the kept, added and deleted products in order to create the representation of the interaction between the kept, added and deleted products 109. Creating the representation of the interaction between the kept, added and deleted products is detailed above FIGS. 2 and 3a-3c and the corresponding text.

At step 405, assortment planning system 100 presents the representation 109 based on the performance metrics of the kept, added and deleted products.

One or more of the steps of the methods, steps and functions described herein and one or more of the components of the systems described herein may be implemented as computer code stored on a computer readable medium, including storage devices, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. Also, the embodiments described herein are generally described with respect to product retailers, but the embodiments may be used by brick and mortar retailers to optimize retail product displays. Furthermore, the embodiments may be used to determine the optimal assortment of products or automatically rearrange products online.

What is claimed is:

1. An assortment planning system, comprising:
   a comparison unit executed by a processor to
      identify products in an initial assortment of products and a performance metric for each product in the initial assortment of products, wherein the performance metric includes at least a sales volume of each product,
      identify products in a desired assortment of products and the performance metric for each product in the desired assortment of products, and
      compare the initial assortment of products and the desired assortment of products and determine:
         kept products, wherein the kept products are at least one product in the initial assortment of products and the desired assortment of products;
         added products, wherein the added products are at least one product added to the initial assortment of products to create the desired assortment of products; and
         deleted products, wherein the deleted products are at least one product deleted from the initial assortment of products to create the desired assortment of products;
   an interaction unit to simulate an interaction of the kept products, the added products, and the deleted products based on the performance metric associated with each of the kept products, the added products and the deleted products, the interaction unit to:
      determine an all add sales volume, wherein the all add sales volume is sales volume for each product in the initial assortment of products including all of the added products;
      subtract, for each of the added products, an incremental sales volume gained upon adding the product to the initial assortment of products that has not been cannibalized from other products from the all add sales volume to calculate the sales volume cannibalized from the deleted products and the kept products; and
   a creation unit to create a representation of the interaction between the kept products, the added products and the deleted products.

2. The assortment planning system of claim 1, further comprising:
   a presentation unit to present the representation of the interaction between the kept products, the added products and the deleted products to an automated merchandising system to reconfigure products in an online catalog based upon the representation of the interaction between the kept products, the added products and the deleted products.

3. The assortment planning system of claim 2, wherein the presentation unit presents the representation of the interaction between the kept products, the added products and the deleted products to a graphical user interface configured to display the representation.

4. The assortment planning system of claim 1, wherein the performance metric is one of or a combination of gross margin, adjusted gross margin, contribution margin and consumer loyalty.

5. The assortment planning system of claim 1, wherein the interaction unit calculates
   for each of the kept products, sales volume that has been cannibalized by each of the newly added products;
   for each of the deleted products, sales volume that has been cannibalized by each of the newly added products;
   for each of the added products, incremental sales volume gained upon adding the product to the initial assortment of products that has not been cannibalized from other products;
   for each of the added products, sales volume cannibalized from the deleted products and the kept products;
   for each of the added products and the kept products, sales volume recaptured from the deleted products;

for each of the deleted products, sales volume lost that has not been cannibalized or recaptured by other products; and for each of the deleted products, recaptured sales volume.

6. The assortment planning system of claim 5, wherein the interaction unit:
  determines, for each of the added products, an intermediate desired assortment of products, wherein the intermediate desired assortment of products includes the initial assortment of products and the added product;
  determines, for each of the added products, sales volume for each product in the intermediate desired assortment of products, wherein at least one of the sales volumes in the intermediate desired assortment of products includes cannibalized sales volume of another product in the intermediate desired assortment of products;
  includes all of the added products in the initial assortment of products; and
  subtracts, for each the of the kept products and each of the deleted products, sales volume in the initial assortment of products from the all add sales volume for each product to calculate the sales volume that has been cannibalized by each of the newly added products.

7. The assortment planning system of claim 6, wherein the interaction unit sums, for each of the added products, a single product incremental value upon adding the product individually and a result of subtracting the all add sales volume from the sales volume in the intermediate desired assortment of products, to calculate the incremental sales volume gained upon adding the product to the initial assortment of products that has not been cannibalized from other products.

8. The assortment planning system of claim 1, wherein the interaction unit subtracts, for each of the added products and the kept products, the all add sales volume from the sales volume of the product in the desired assortment of products to calculate the sales volume recaptured from the deleted products.

9. The assortment planning system of claim 8, wherein the interaction unit is to:
  determine the sales volume of each of the products in the desired assortment of products as each of the deleted products are individually included in the desired assortment of products to calculate an incremental change caused by the deletion of the deleted product;
  sum the sales volumes of all of the products in the desired assortment of products as each of the deleted products is individually included in the desired assortment of products to calculate a total sales volume of all the products;
  subtract, for each of the deleted products, the total sales volume of all of the products from the total sales volume of the desired assortment of products to calculate an estimated incremental loss;
  divide the estimated incremental loss for each of the deleted products by the sum of the estimated incremental losses of each deleted product to calculate each deleted product's share of the total incremental lost sales volume;
  subtract, for each of the deleted products, the all add sales volume from the total sales volume in the desired assortment of products to calculate a total lost sales volume from all deletions; and
  multiply, for each of the deleted products, deleted product's share of the total incremental lost sales volume by the total lost sales volume from all deletions to calculate sales volume lost that has not been cannibalized or recaptured by other products.

10. The assortment planning system of claim 9, wherein the interaction unit is to sum, for each deleted product, the all add sales volume and the sales volume lost that has not been cannibalized or recaptured by other products to calculate the recaptured sales volume.

11. The assortment planning system of claim 1, further comprising a transfer demand engine, wherein the initial assortment of products, the desired assortment of products and the performance metric associated with each product are determined by the transfer demand engine.

12. The assortment planning system of claim 1, further comprising a graphical user interface to accept a list of products existing in the initial assortment of products and a list of products for the desired assortment of products.

13. An assortment planning method, comprising:
  identifying products in an initial assortment of products and a sales volume for each product in the initial assortment of products;
  identifying products in a desired assortment of products and a sales volume for each product in the desired assortment of products;
  comparing, using a processor, the initial assortment of products and the desired assortment of products and determining
    kept products, wherein the kept products are at least one product in the initial assortment of products and the desired assortment of products,
    added products, wherein the added products are at least one product added to the initial assortment of products to create the desired assortment of products, and
    deleted products, wherein the deleted products are at least one product deleted from the initial assortment of products to create the desired assortment of products;
  simulating the interaction of the kept products, the added products and the deleted products based on the sales volume associated with each of the kept products, the added products and the deleted products, the simulating including:
  determining an all add sales volume, wherein the all add sales volume is sales volume for each product in the initial assortment of products including all of the added products;
  subtracting, for each of the added products, an incremental sales volume gained upon adding the product to the initial assortment of products that has not been cannibalized from other products from the all add sales volume to calculate the sales volume cannibalized from the deleted products and the kept products; and
  creating and presenting a representation of the interaction between added products, deleted products and kept products based on the sales volumes of the added products, deleted products and kept products.

14. The method of claim 13, wherein the representation of the interaction between added products, deleted products and kept products includes
  for each of the kept products, sales volume that has been cannibalized by each of the newly added products;
  for each of the deleted products, sales volume that has been cannibalized by each of the newly added products;
  for each of the added products, incremental sales volume gained upon adding the product to the initial assortment of products that has not been cannibalized from other products;
  for each of the added products, sales volume cannibalized from the deleted products and the kept products;

for each of the added products and the kept products, sales volume recaptured from the deleted products;

for each of the deleted products, sales volume lost that has not been cannibalized or recaptured by other products; and for each of the deleted products, recaptured sales volume.

15. The method of claim 13, further comprising:

determining, for each of the added products, an intermediate desired assortment of products, wherein the intermediate desired assortment of products includes the initial assortment of products and the added product, and determining, for each of the added products, sales volume for each product in the intermediate desired assortment of products, wherein at least one of the sales volumes in the intermediate desired assortment of products includes cannibalized sales volume of another product in the intermediate desired assortment of products;

including all of the added products in the initial assortment of products;

determining an all add sales volume, wherein the all add sales volume is sales volume for each product in the initial assortment of products including all of the added products;

subtracting, for each the of the kept products and each of the deleted products, sales volume in the initial assortment of products from the all add sales volume for each product to calculate sales volume that has been cannibalized by each of the newly added products;

summing, for each of the added products, a single product incremental value upon adding the product individually and a result of subtracting the all add sales volume from the sales volume in the intermediate desired assortment of products, to calculate an incremental sales volume gained upon adding the product to the initial assortment of products that has not been cannibalized from other products;

subtracting, for each of the added products and the kept products, the all add sales volume from the sales volume of the product in the desired assortment of products to calculate sales volume recaptured from the deleted products;

determining the sales volume of each of the products in the desired assortment of products as each of the deleted products are individually included in the desired assortment of products to calculate an incremental change caused by the deletion of the deleted product;

summing the sales volumes of all of the products in the desired assortment of products as each of the deleted products are individually included in the desired assortment of products to calculate a total sales volume of all the products;

subtracting, for each of the deleted products, the total sales volume of all of the products from the total sales volume of the desired assortment of products to calculate an estimated incremental loss;

dividing the estimated incremental loss for each of the deleted products by the sum of the estimated incremental losses of each deleted product to calculate each deleted product's share of the total incremental lost sales volume;

subtracting, for each of the deleted products, the all add sales volume from the total sales volume in the desired assortment of products to calculate a total lost sales volume from all deletions;

multiplying, for each of the deleted products, deleted product's share of the total incremental lost sales volume by the total lost sales volume from all deletions to calculate sales volume lost that has not been cannibalized or recaptured by other products; and summing, for each deleted product, the all add sales volume and the sales volume lost that has not been cannibalized or recaptured by other products to calculate recaptured sales volume.

16. The method of claim 13, wherein the presenting step includes presenting the representation of the interaction between added products, deleted products and kept products to an automated merchandising system.

17. The method of claim 16, wherein the automated merchandising system reconfigures products in an online catalog based upon the representation of the interaction between the kept products, the added products and the deleted products.

18. A non-transitory computer readable medium having stored thereon a computer executable code, the computer executable code when executed causes a computer system to:

identify products in an initial assortment of products and a performance metric for each product in the initial assortment of products;

identify products in a desired assortment of products and the performance metric for each product in the desired assortment of products;

compare the initial assortment of products and the desired assortment of products and determine:

kept products, wherein the kept products are at least one product in the initial assortment of products and the desired assortment of products;

added products, wherein the added products are at least one product added to the initial assortment of products to create the desired assortment of products; and deleted products, wherein the deleted products are at least one product deleted from the initial assortment of products to create the desired assortment of products;

simulate the interaction of the kept products, the added products and the deleted products based on the performance metric associated with each of the kept products, the added products and the deleted products, including to:

determine an all add sales volume, wherein the all add sales volume is sales volume for each product in the initial assortment of products including all of the added products;

subtract, for each of the added products, an incremental sales volume gained upon adding the product to the initial assortment of products that has not been cannibalized from other products from the all add sales volume to calculate the sales volume cannibalized from the deleted products and the kept products; and create and present a representation of the interaction between added products, deleted products and kept products based on the performance metric of the added products, deleted products and kept products.

* * * * *